US010884880B2

(12) United States Patent
Liu et al.

(10) Patent No.: US 10,884,880 B2
(45) Date of Patent: Jan. 5, 2021

(54) METHOD FOR TRANSMITTING REQUEST MESSAGE AND APPARATUS

(71) Applicant: Huawei Technologies Co., Ltd., Guangdong (CN)

(72) Inventors: Yuejin Liu, Shenzhen (CN); Youyu Jiang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 185 days.

(21) Appl. No.: 16/102,625

(22) Filed: Aug. 13, 2018

(65) Prior Publication Data

US 2018/0349236 A1 Dec. 6, 2018

Related U.S. Application Data

(63) Continuation of application No. PCT/CN2017/080289, filed on Apr. 12, 2017.

(30) Foreign Application Priority Data

Apr. 29, 2016 (CN) .......................... 2016 1 0289644

(51) Int. Cl.
*G06F 11/00* (2006.01)
*G06F 9/00* (2006.01)
(Continued)

(52) U.S. Cl.
CPC .......... *G06F 11/20* (2013.01); *G06F 9/44526* (2013.01); *G06F 9/45558* (2013.01);
(Continued)

(58) Field of Classification Search
CPC ..... G06F 11/20; G06F 9/45558; G06F 13/105
See application file for complete search history.

(56) References Cited

U.S. PATENT DOCUMENTS 5,280,610 A * 1/1994 Travis, Jr. ............... G06F 9/465
5,329,619 A * 7/1994 Page ........................ G06F 9/546
707/999.104
(Continued)

FOREIGN PATENT DOCUMENTS

CN 101499995 A 8/2009
CN 101631287 A 1/2010
(Continued)

OTHER PUBLICATIONS

International Standard, "Information technology—Multipath Management (API)," ISO/IEC, Edition 1.0, Jul. 2008, 11002:2008, Switzerland, Jul. 2008, 88 pages. XP082004939.

*Primary Examiner* — Jonathan D Gibson
(74) *Attorney, Agent, or Firm* — Womble Bond Dickinson (US) LLP

(57) ABSTRACT

A method for transmitting a request message and an apparatus are disclosed, to resolve a prior-art problem that in an ICT network, when a request message is transmitted, a probability that the request message fails to be transmitted is increased, and reliability of transmitting the request message is reduced. The method includes: determining, by a dispatcher according to information that is about a first controller and that is included in a received request message, a corresponding first driver adaptation plug-in group, where the first controller is connected to at least one driver adaptation plug-in included in the first driver adaptation plug-in group; and selecting, by the dispatcher from the at least one driver adaptation plug-in, at least one to-be-selected driver adaptation plug-in whose running status is normal, and eventually sending the request message to the first controller by using one to-be-selected driver adaptation plug-in.

20 Claims, 8 Drawing Sheets

(51) Int. Cl.
  *G06F 11/20* (2006.01)
  *G06F 13/10* (2006.01)
  *G06F 9/455* (2018.01)
  *G06F 13/36* (2006.01)
  *H04L 12/26* (2006.01)
  *G06F 9/445* (2018.01)

(52) U.S. Cl.
  CPC ............ *G06F 13/105* (2013.01); *G06F 13/36* (2013.01); *H04L 43/0805* (2013.01); *G06F 2009/45595* (2013.01)

(56) References Cited

U.S. PATENT DOCUMENTS

| | | | | |
|---|---|---|---|---|
| 5,822,585 A | * | 10/1998 | Noble | G06F 9/465 719/316 |
| 6,026,404 A | * | 2/2000 | Adunuthula | G06F 9/4843 |
| 6,098,093 A | * | 8/2000 | Bayeh | H04L 29/06 709/200 |
| 6,138,011 A | | 10/2000 | Sanders, III et al. | |
| 6,973,480 B2 | * | 12/2005 | Karim | H04L 67/30 709/203 |
| 9,575,779 B1 | * | 2/2017 | Wewers | G06F 9/44536 |
| 2007/0240134 A1 | * | 10/2007 | Buragohain | G06F 9/44526 717/140 |
| 2012/0023245 A1 | | 1/2012 | Mouquet et al. | |
| 2014/0112192 A1 | | 4/2014 | Chou et al. | |
| 2014/0280817 A1 | | 9/2014 | Uppalapati et al. | |

FOREIGN PATENT DOCUMENTS

| | | |
|---|---|---|
| CN | 102891806 A | 1/2013 |
| CN | 105515844 A | 4/2016 |
| EP | 0506278 A2 | 9/1992 |
| EP | 1027794 A2 | 8/2000 |
| WO | 9923785 A2 | 5/1999 |

* cited by examiner

US 10,884,880 B2

METHOD FOR TRANSMITTING REQUEST MESSAGE AND APPARATUS

CROSS-REFERENCE TO RELATED APPLICATIONS

This application is a continuation of International Application No. PCT/CN2017/080289 filed on Apr. 12, 2017, which claims priority to Chinese Patent Application No. 201610289644.6 filed on Apr. 29, 2016. The disclosures of the aforementioned applications are hereby incorporated by reference in their entireties.

TECHNICAL FIELD

The present disclosure relates to the field of communications technologies, and in particular, to a method for transmitting a request message and an apparatus.

BACKGROUND

Information and communications technology (ICT) emerges to satisfy a requirement of merging an information technology and a communications technology in the information age.

An ICT network mainly includes an ICT-orchestration (ICT-O) system and multiple controllers. The ICT-O system is also referred to as a service orchestration system. The ICT-O system is configured to: receive a service request from a user, perform processing such as decomposition and redesigning on the service request, to convert the service request into multiple request messages that are comprehensible to and executable by the controllers in the network, perform scheduling processing on the multiple request messages, and forward each request message to a corresponding controller. The ICT-O system may be divided into multiple logical modules according to different execution functions. The logical modules are, for example, a service decomposition and designing module configured to decompose and redesign a service request, an executor configured to perform scheduling processing on multiple request messages, and a dispatcher configured to forward each request message. The controller has a logical control function, is deployed between the ICT-O system and a network device and/or an infrastructure, and sends, according to a received request message in the ICT-O system, a network instruction corresponding to the request message to a network device and/or an infrastructure corresponding to the request message. In the network, the ICT-O system interacts with each controller by using a driver adaptation plug-in.

To deal with issues about capacity management and reliability, a manner of cluster and cloud deployment for a service is used in the network. In this way, the network has a relatively large quantity of controllers and correspondingly a relatively large quantity of driver adaptation plug-ins.

After receiving a service request that is made by a user for a type of service, the ICT-O system in the network decomposes the service request, to generate multiple request messages. Each request message includes a target controller identifier corresponding to each request message. The ICT-O system sends the multiple request messages to the dispatcher by using the executor. After receiving a request message, the dispatcher performs load balancing on multiple driver adaptation plug-ins, selects a proper driver adaptation plug-in, and sends, by using the selected driver adaptation plug-in, the request message to a target controller corresponding to the target controller identifier included in the request message. The driver adaptation plug-in selected by the dispatcher is any one of the multiple driver adaptation plug-ins.

However, in an actual scenario, some driver adaptation plug-ins cannot be connected to some controllers. In this case, when a target controller for a request message received by a dispatcher is not connected to a driver adaptation plug-in selected by the dispatcher, the request message fails to be transmitted. Therefore, when a request message is transmitted by using the foregoing method, a probability that the request message fails to be transmitted is increased, and reliability of transmitting the request message is reduced.

SUMMARY

The present disclosure provides a method for transmitting a request message and an apparatus, to resolve a prior-art problem that in an ICT network, when a request message is transmitted, a probability that the request message fails to be transmitted is increased, and reliability of transmitting the request message is reduced.

Specific technical solutions provided in the present disclosure are as follows:

According to an aspect, an embodiment of the present disclosure provides a method for transmitting a request message, where the method is applicable to an ICT-O system in an ICT network, a dispatcher in the method may be a module that has a distribution function and that is in the ICT-O system, and the method includes:

after a dispatcher receives a request message obtained by the ICT-O system by decomposing a service request, first, obtaining, by the dispatcher, information that is about a first controller and that is included in the request message, where the information about the first controller is information that uniquely identifies the first controller, for example, a route distinguisher of the first controller; then determining, by the dispatcher in a correspondence that is between the information about multiple controllers and a driver adaptation plug-in group and that is locally stored or stored in another storage device in the ICT-O system, a first driver adaptation plug-in group corresponding to the information about the first controller, where the first controller is connected to at least one driver adaptation plug-in included in the first driver adaptation plug-in group; obtaining, by the dispatcher, a running status of the at least one driver adaptation plug-in that is connected to the first controller and that is included in the first driver adaptation plug-in group, and determining, in the at least one driver adaptation plug-in, at least one to-be-selected driver adaptation plug-in whose running status is normal; and eventually, sending, by the dispatcher, the request message to the first controller by using one of the at least one to-be-selected driver adaptation plug-in.

By means of the foregoing method, the at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using one of the at least one to-be-selected driver adaptation plug-in in order to avoid a case in which abnormal running of a driver adaptation plug-in causes a failure in transmitting the request message.

In a possible design, the information about the first controller is the route distinguisher of the first controller, and the route distinguisher can uniquely identify the first controller. The information about the first controller may further be information such as an identifier of the first controller.

In a possible design, each driver adaptation plug-in included in the first driver adaptation plug-in group has a same type. Different interfaces are maintained for different types of driver adaptation plug-ins. Therefore, an interface of each driver adaptation plug-in included in the first driver adaptation plug-in group matches an interface of the first controller.

By means of the foregoing manner, the at least one driver adaptation plug-in in the first driver adaptation plug-in group has a same type, and an interface of a driver adaptation plug-in of the type matches the interface of the first controller. It may be ensured that the dispatcher can successfully transmit the request message to the first controller by using any driver adaptation plug-in included in the first driver adaptation plug-in group, thereby reducing a probability that the request message fails to be transmitted because an interface of a controller does not match an interface of a driver adaptation plug-in and increasing reliability of transmitting the request message.

In a possible design, when there are different types of controllers, the type of each driver adaptation plug-in included in the first driver adaptation plug-in group matches the type of the first controller.

In a possible design, when the first driver adaptation plug-in group includes at least one driver adaptation plug-in having different types, the request message further includes a first type of a driver adaptation plug-in. The dispatcher needs to first obtain the first type included in the request message; and then determine, in the at least one driver adaptation plug-in, the at least one to-be-selected driver adaptation plug-in whose type is the same as the first type and whose running status is normal, thereby obtaining the at least one to-be-selected driver adaptation plug-in. The first type that is of the driver adaptation plug-in and that is included in the request message indicates that the dispatcher can successfully transmit the request message to the first controller by using a driver adaptation plug-in of only the first type, that is, an interface of the driver adaptation plug-in of the first type matches the interface of the first controller.

By means of the foregoing method, the dispatcher may subsequently select, from the first driver adaptation plug-in group, the at least one to-be-selected driver adaptation plug-in of the first type. It may be ensured that the dispatcher can successfully transmit the request message to the first controller by using any driver adaptation plug-in of the at least one to-be-selected driver adaptation plug-in, thereby reducing a probability that the request message fails to be transmitted because an interface of a controller does not match an interface of a driver adaptation plug-in and increasing reliability of transmitting the request message.

In a possible design, in the correspondence between information about multiple controllers and a driver adaptation plug-in group, each of multiple controllers corresponding to the first driver adaptation plug-in group has a same limited connection quantity, and a quantity of driver adaptation plug-ins included in the first driver adaptation plug-in group is less than or equal to the limited connection quantity of each controller corresponding to the first driver adaptation plug-in group.

By means of the foregoing method, when the first controller has the limited connection quantity, it may be ensured that the dispatcher can successfully transmit the request message to the first controller by using any driver adaptation plug-in in the first driver adaptation plug-in group in order to avoid a case in which when the quantity of driver adaptation plug-ins included in the first driver adaptation plug-in group is greater than the limited connection quantity of the first controller, the request message fails to be transmitted because a target driver adaptation plug-in selected by the dispatcher is not connected to the first controller, thereby increasing reliability of transmitting the request message.

In a possible design, in the correspondence between information about multiple controllers and a driver adaptation plug-in group, a home location of each of the multiple controllers corresponding to the first driver adaptation plug-in group is the same as a home location of each driver adaptation plug-in included in the first driver adaptation plug-in group.

By means of the foregoing method, it may be ensured that the dispatcher can successfully transmit the request message to the first controller by using any driver adaptation plug-in in the first driver adaptation plug-in group in order to avoid a case in which when the first driver adaptation plug-in group includes a driver adaptation plug-in whose home location is different from a home location of the first controller, the request message fails to be transmitted because a home location of the target driver adaptation plug-in selected by the dispatcher is different from the home location of the first controller, thereby increasing reliability of transmitting the request message.

In a possible design, when a quantity of the at least one to-be-selected driver adaptation plug-in is greater than 1, when sending the request message to the first controller by using one of the at least one to-be-selected driver adaptation plug-in, the dispatcher can determine, in the multiple to-be-selected driver adaptation plug-ins by performing load balancing processing on the multiple to-be-selected driver adaptation plug-ins, one target driver adaptation plug-in, and then send the request message to the first controller by using the determined target driver adaptation plug-in.

By means of the foregoing method, by performing load balancing processing on the at least one to-be-selected driver adaptation plug-in, the dispatcher determines one target driver adaptation plug-in of the at least one to-be-selected driver adaptation plug-in such that load balance of the at least one to-be-selected driver adaptation plug-in can be ensured.

In a possible design, the dispatcher may use multiple methods of load balancing processing, for example, a method of polling according to a specified sequence, a random selection method, or a method of selection according to a specified characteristic.

By means of the foregoing method, the dispatcher may determine one target driver adaptation plug-in of the at least one to-be-selected driver adaptation plug-in by performing load balancing processing on the at least one to-be-selected driver adaptation plug-in.

According to another aspect, an embodiment of the present disclosure further provides a method for generating a correspondence between information about a controller and a driver adaptation plug-in group, where the method is applicable to an ICT-O system in an ICT network, a group manager in this method is deployed in the ICT-O system, and the method includes:

after the group manager obtains information about a controller, first determining, by the group manager, in multiple driver adaptation plug-ins in the ICT network, at least one driver adaptation plug-in connected to the controller; and eventually generating a correspondence between the information about the controller and a driver adaptation plug-in group, where the driver adaptation plug-in group includes the at least one driver adaptation plug-in.

By means of the foregoing method, the at least one driver adaptation plug-in included in the driver adaptation plug-in group is all connected to the controller. Therefore, it is ensured that a dispatcher can successfully transmit a request message to the controller by using any driver adaptation plug-in included in the driver adaptation plug-in group, thereby reducing a probability that the request message fails to be transmitted because a controller is not connected to a driver adaptation plug-in and increasing reliability of transmitting the request message.

In a possible design, the information about the controller is a route distinguisher of the controller, and the route distinguisher can uniquely identify the controller. The information about the t controller may further be information such as an identifier of the controller.

In a possible design, the group manager may determine, in multiple driver adaptation plug-ins by using a type of a driver adaptation plug-in, at least one driver adaptation plug-in corresponding to the controller, that is, obtain a type of each driver adaptation plug-in of the multiple driver adaptation plug-ins, and then determine, in the multiple driver adaptation plug-ins, the at least one driver adaptation plug-in having a same type.

By means of the foregoing manner, the selected at least one driver adaptation plug-in has a same type, and an interface of a driver adaptation plug-in of the type matches the interface of the controller. Subsequently, it may be ensured that the dispatcher can successfully transmit the request message to the controller by using any of the at least one driver adaptation plug-in, thereby reducing a probability that the request message fails to be transmitted because an interface of a controller does not match an interface of a driver adaptation plug-in and increasing reliability of transmitting the request message.

In a possible design, a quantity of the at least one driver adaptation plug-in is less than or equal to a limited connection quantity of the controller. By means of the method, when the controller has the limited connection quantity, it may be ensured that the dispatcher can successfully transmit the request message to the controller by using any of the at least one driver adaptation plug-in in order to avoid a case in which when the quantity of the at least one driver adaptation plug-in is greater than the limited connection quantity of the controller, the request message fails to be transmitted because a target driver adaptation plug-in selected by the dispatcher is not connected to the controller, thereby increasing reliability of transmitting the request message.

In a possible design, a home location of the at least one driver adaptation plug-in is the same as a home location of the controller. By means of the method, it may be ensured that the dispatcher can successfully transmit the request message to the controller by using any of the at least one driver adaptation plug-in in order to avoid a case in which when the at least one driver adaptation plug-in includes a driver adaptation plug-in whose home location is different from a home location of the controller, the request message fails to be transmitted because a home location of the target driver adaptation plug-in selected by the dispatcher is different from the home location of the controller, thereby increasing reliability of transmitting the request message.

In a possible design, after the group manager generates the correspondence between the information about the controller and a driver adaptation plug-in group, the group manager obtains a running status of the at least one driver adaptation plug-in. For example, the group manager may periodically obtain the running status of the at least one driver adaptation plug-in. Alternatively, the at least one driver adaptation plug-in may periodically report a running status of the at least one driver adaptation plug-in. Alternatively, the at least one driver adaptation plug-in may report a current running status of the at least one driver adaptation plug-in when determining that a running status of the at least one driver adaptation plug-in changes. In this way, the group manager may update the running status of the at least one driver adaptation plug-in in the driver adaptation plug-in group.

By means of the foregoing method, the group manager may determine a running status of each driver adaptation plug-in in the driver adaptation plug-in group corresponding to the controller. Subsequently, when determining a to-be-selected driver adaptation plug-in, the dispatcher may select, from the at least one driver adaptation plug-in according to the running status that is of the at least one driver adaptation plug-in and that is obtained by the group manager, at least one to-be-selected driver adaptation plug-in whose running status is normal.

In a possible design, the group manager performs later maintenance on the generated correspondence between the information about the controller and a driver adaptation plug-in group. For example, when the controller is deregistered, the group manager deletes the correspondence between the information about the controller and a driver adaptation plug-in group. When a driver adaptation plug-in in the driver adaptation plug-in group is deregistered, the group manager deletes the deregistered driver adaptation plug-in in the driver adaptation plug-in group corresponding to the controller. When the dispatcher fails to send a request message to the controller according to a target driver adaptation plug-in in the driver adaptation plug-in group, the group manager may alternatively delete the target driver adaptation plug-in in the driver adaptation plug-in group corresponding to the controller.

By means of the foregoing method, the group manager can ensure that each driver adaptation plug-in in the driver adaptation plug-in group in the correspondence between the information about the controller and a driver adaptation plug-in group stays connected to the controller. It is ensured that subsequently, the dispatcher can successfully transmit the request message to the controller by using any driver adaptation plug-in in the driver adaptation plug-in group.

According to still another aspect, an embodiment of the present disclosure further provides a dispatcher. The dispatcher has a function of implementing a behavior of the dispatcher in the foregoing method embodiments. The function may be implemented by using hardware, or may be implemented by hardware executing corresponding software. The hardware or software includes one or more modules corresponding to the foregoing functions.

In a possible design, a structure of the dispatcher includes a receiving unit, a processing unit, and a sending unit. These units can perform the corresponding functions in the foregoing method embodiments. Specifically, refer to the detailed description in the method embodiments, and details are not described herein again.

In a possible design, a structure of the dispatcher includes a transceiver, a processor, a bus, and a memory. The transceiver is configured to communicate and interact with a device or module connected to the dispatcher. The processor is configured to support the dispatcher to perform the corresponding functions in the foregoing method. The memory is coupled to the processor, and the memory stores a program instruction and data that are necessary for the dispatcher.

According to still another aspect, an embodiment of the present disclosure further provides a group manager. The group manager has a function of implementing a behavior of the group manager in the foregoing method embodiments. The function may be implemented by using hardware, or may be implemented by hardware executing corresponding software. The hardware or software includes one or more modules corresponding to the foregoing functions.

In a possible design, a structure of the group manager includes a processing unit and a generation unit. These units can perform the corresponding functions in the foregoing method embodiments. Specifically, refer to the detailed description in the method embodiments, and details are not described herein again.

In a possible design, a structure of the group manager includes a transceiver, a processor, a bus, and a memory. The transceiver is configured to communicate with and interact with another device that is connected to the group manager. The processor is configured to support the group manager to perform the corresponding functions in the foregoing method. The memory is coupled to the processor, and the memory stores a program instruction and data that are necessary for the group manager.

According to still another aspect, an embodiment of the present disclosure provides an ICT-O system. The system includes a dispatcher and a group manager. The dispatcher has a function of implementing a behavior of the dispatcher in the foregoing method embodiments. The group manager has a function of implementing a behavior of the group manager in the foregoing method embodiments.

According to still another aspect, an embodiment of the present disclosure provides one or more computer program products. The computer program products include a software program. The software program implements any one or more of the foregoing methods when being executed by one or more processors.

By means of the method for transmitting a request message provided in the present disclosure, after receiving a request message, a dispatcher deployed in an ICT-O system determines, according to information that is about a first controller and that is included in the request message, a first driver adaptation plug-in group corresponding to the information about the first controller. The first controller is connected to at least one driver adaptation plug-in included in the first driver adaptation plug-in group. The dispatcher selects, from the at least one driver adaptation plug-in included in the first driver adaptation plug-in group, at least one to-be-selected driver adaptation plug-in whose running status is normal. Eventually, the dispatcher may send the request message to the first controller by using one to-be-selected driver adaptation plug-in. The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using one of the at least one to-be-selected driver adaptation plug-in in order to avoid a case in which abnormal running of a driver adaptation plug-in causes a failure in transmitting the request message.

DETAILED DESCRIPTION

Figure 1:
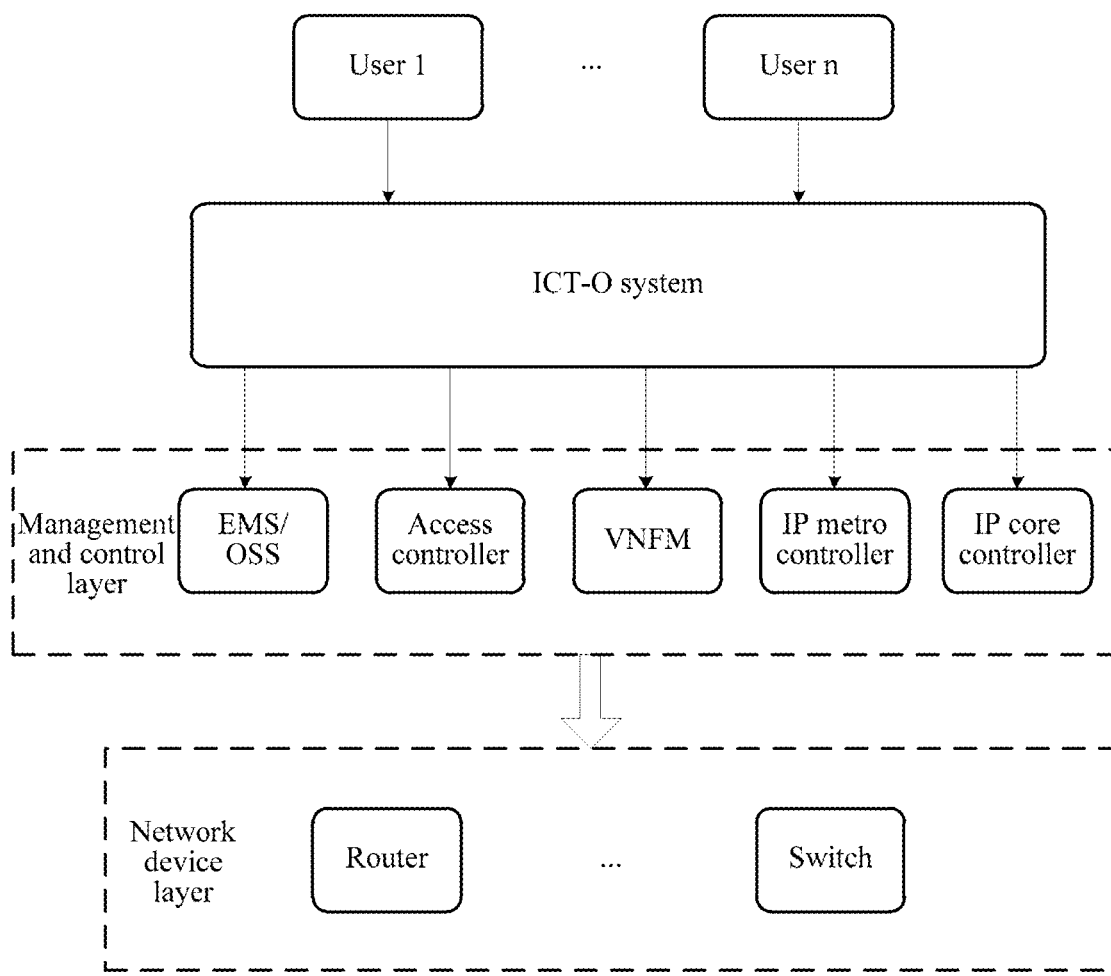
FIG. 1 is a schematic architectural diagram of an ICT network according to an embodiment of the present disclosure.

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides a method for transmitting a request message and an apparatus, to resolve a prior-art problem that in an ICT network, when a request message is transmitted, a probability that the request message fails to be transmitted is increased, and reliability of transmitting the request message is reduced. The method and the apparatus in the present disclosure are based on a same inventive concept. The method and the apparatus have similar principles of resolving problems. Therefore, refer to both the implementation of the apparatus and the implementation of the method. Details about repeated content are not described again.

In this embodiment of the present disclosure, after receiving a request message, a dispatcher deployed in an ICT-O system determines, according to information that is about a first controller and that is included in the request message, a first driver adaptation plug-in group corresponding to the information about the first controller. The first controller is connected to at least one driver adaptation plug-in included in the first driver adaptation plug-in group. The dispatcher selects, from the at least one driver adaptation plug-in included in the first driver adaptation plug-in group, at least one to-be-selected driver adaptation plug-in whose running status is normal. Eventually, the dispatcher may send the request message to the first controller by using one to-be-selected driver adaptation plug-in. The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using one of the at least one to-be-selected driver adaptation plug-in in order to avoid a case in which abnormal running of a driver adaptation plug-in causes a failure in transmitting the request message.

The method for transmitting a request message provided in this embodiment of the present disclosure is applicable to the ICT network. As shown in FIG. 1, if the network is divided according to logical functions, the network may be divided into an ICT-O system, a management and control layer, and a network device layer.

A user may access the ICT-O system. The user may be an operator user (for example, a business support system (BSS), an operation support system (OSS), or an administrator), an enterprise user, an individual user, or a developer. The user may use a web console or another system to initiate a service request, for example, a request for creating a virtual private network (VPN) from Shenzhen to Beijing, a request for creating a cloud host in a cloud, or the like.

The ICT-O system receives the service request from the user, performs processing such as decomposition and redesigning on the service request, to convert the service request into multiple request messages that are comprehensible to and executable by controllers on the management and control layer in the network, performs scheduling processing on the multiple request messages, and forwards each request message to a corresponding controller. The ICT-O system interacts with a controller on the management and control layer by using a driver adaptation plug-in.

The management and control layer includes multiple controllers that have a logical control and management function, for example, an element management system (EMS)/OSS, an access controller, a virtualized network function manager (VNFM), an Internet Protocol (IP) metro controller, an intelligent (IP) core controller, and the like. On the management and control layer, after receiving a request message from the ICT-O system, a controller manages and controls a corresponding network device and/or infrastructure according to the request message, that is, sends a network instruction to the corresponding network device and/or infrastructure.

The network device layer includes a network device, an infrastructure, and the like, such as a router and a switch. The network device and the infrastructure on the network device layer may be, but are not limited to, a device in the following application scenarios: a mobile broadband (MBB) network, a fixed broadband (FBB) network, a software defined network (SDN), network function virtualization (NFV), and a hybrid cloud.

Figure 2:
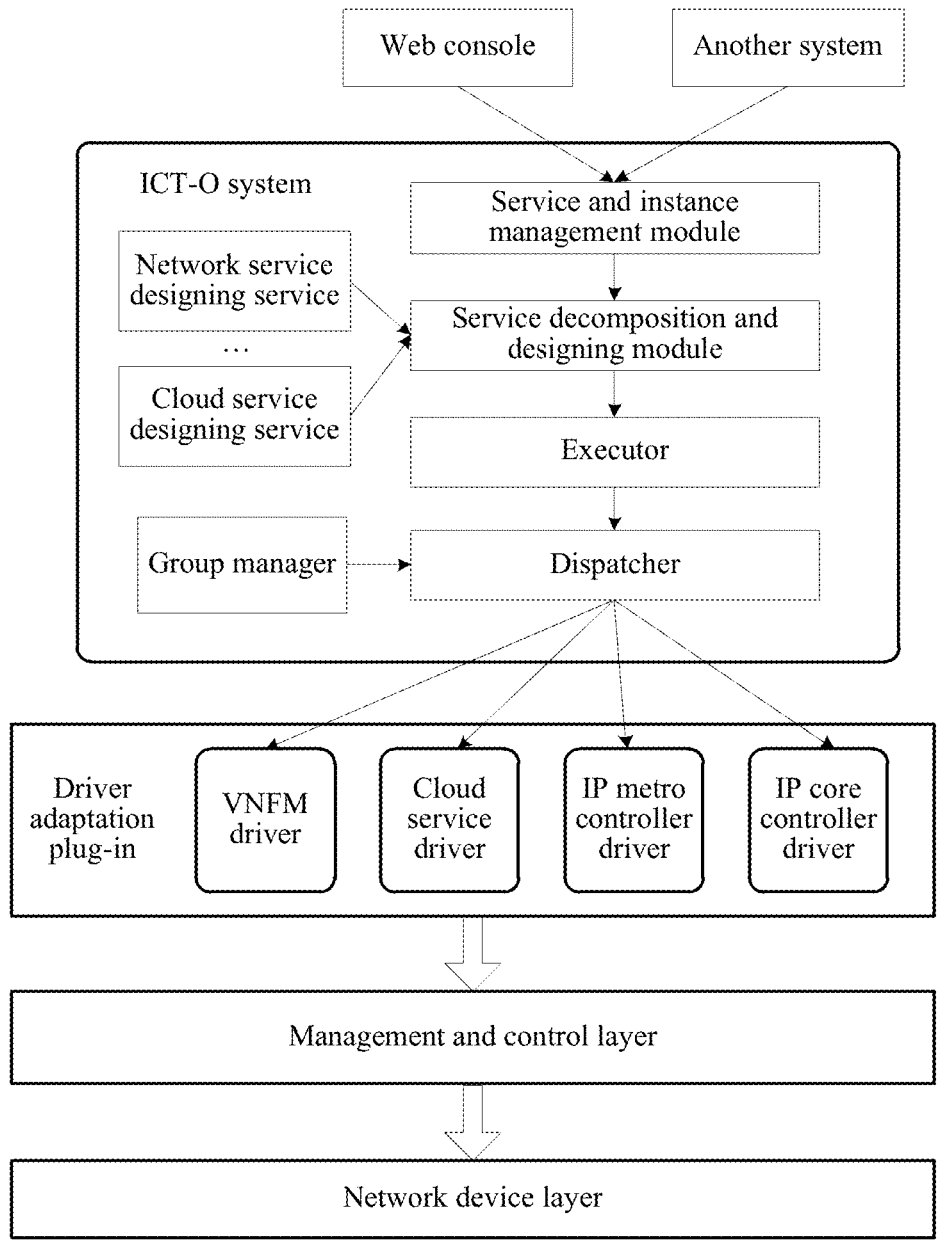
FIG. 2 is a schematic architectural diagram of another ICT network according to an embodiment of the present disclosure.

Based on the ICT network shown in FIG. 1, an embodiment of the present disclosure provides an architecture of another possible ICT network shown in FIG. 2. In the ICT network, the ICT-O system may be divided into multiple different logical modules according to a logical function of the ICT-O system. As shown in the figure, the ICT-O system includes a service and instance management module, a service decomposition and designing module, an executor, a dispatcher, a group manager, and the like.

The service and instance management module is an entry to the ICT-O system, and is responsible for receiving a service request that is sent by a user by using a web console or another system, and managing a lifecycle of the service request. The user may add a service, modify a service, delete a service, view a service, or perform other operations by using the service and instance management module.

By means of decomposition and redesigning, the service decomposition and designing module may convert, according to a network service designing service, a service designing service, and the like that are maintained by the ICT-O system, a user-oriented service request into multiple device-oriented request messages that are comprehensible to and processable by controllers in the ICT network. Each request message includes information about a target controller corresponding to each request message.

The executor schedules, according to a constraint relationship and an association relationship between multiple request messages generated by means of decomposition, the multiple request messages. That is, the executor needs to ensure that a device-oriented request message can be quickly and reliably executed. For example, for some request messages that can be concurrently processed, the executor concurrently processes these request messages. For some request messages that need to be executed according to a sequence, the executor executes these request messages in turn according to the sequence.

The dispatcher selects, for each request message, one driver adaptation plug-in from multiple driver adaptation plug-ins such that each request message may be sent to a corresponding target controller by using the selected driver adaptation plug-in. When a group manager is maintained in the ICT-O system, the group manager may allocate a corresponding driver adaptation plug-in group to each controller in the ICT network, and generate a correspondence between information about multiple controllers and a driver adaptation plug-in group. The dispatcher may determine the driver adaptation plug-in group according to information that is about a target controller and that is included in each request message, and then select one driver adaptation plug-in included the driver adaptation plug-in group to send a corresponding request message. The dispatcher may include a bus that has a distribution feature. This is not limited in the present disclosure.

The group manager may allocate a corresponding driver adaptation plug-in group to each controller in the ICT network, and generate the correspondence between information about multiple controllers and a driver adaptation plug-in group. At least one driver adaptation plug-in included in a driver adaptation plug-in group corresponding to any controller is connected to the controller. The group manager may separately allocate a corresponding driver adaptation plug-in group to each controller according to a network deployment requirement, geographic location distribution, an execution efficiency requirement, a multi-user concurrent processing need, and a reliability need in order to generate the correspondence between information about multiple controllers and a driver adaptation plug-in group.

A driver adaptation plug-in in the ICT network is a bridge connecting a controller to the ICT-O system. One driver adaptation plug-in may correspond to at least one controller, and one controller corresponds to at least one driver adaptation plug-in.

A manner of cluster and cloud deployment for a service is generally used in the ICT network. In this way, the network has a relatively large quantity of controllers and correspondingly a relatively large quantity of driver adaptation plug-ins. In the prior art, after receiving a request message, the dispatcher in the ICT-O system performs load balancing on all driver adaptation plug-ins in the ICT network, and selects a proper driver adaptation plug-in of all the driver adaptation plug-ins to transmit the request message. However, the ICT network has a relatively large quantity of driver adaptation plug-ins, and the dispatcher performs load balancing on all the driver adaptation plug-ins. Therefore, a calculation load of the dispatcher is increased, and a time for selecting the proper driver adaptation plug-in is increased, resulting in reduced user experience.

In addition, connections cannot be established between some driver adaptation plug-ins and some controllers in the ICT network. For example, a controller has a limited connection quantity, and the limited connection quantity is a maximum quantity of driver adaptation plug-ins to which the controller can be connected. Therefore, when a quantity of driver adaptation plug-ins in the ICT network is greater than the limited connection quantity, at most driver adaptation plug-ins whose quantity is the limited connection quantity are connected to the controller in the ICT network, and the remaining driver adaptation plug-ins cannot be connected to the controller. For another example, a home location of a controller is Beijing, and a home location of some driver adaptation plug-ins is Shenzhen. Therefore, these driver adaptation plug-ins cannot be connected to the controller. Based on the foregoing description, a probability that a driver adaptation plug-in that complies with load balancing and that is selected by the dispatcher for a request message is not connected to a target controller corresponding to the request message is relatively high. That is, a probability that the request message fails to be transmitted is relatively high, and reliability of transmitting the request message is relatively low.

Figure 3:
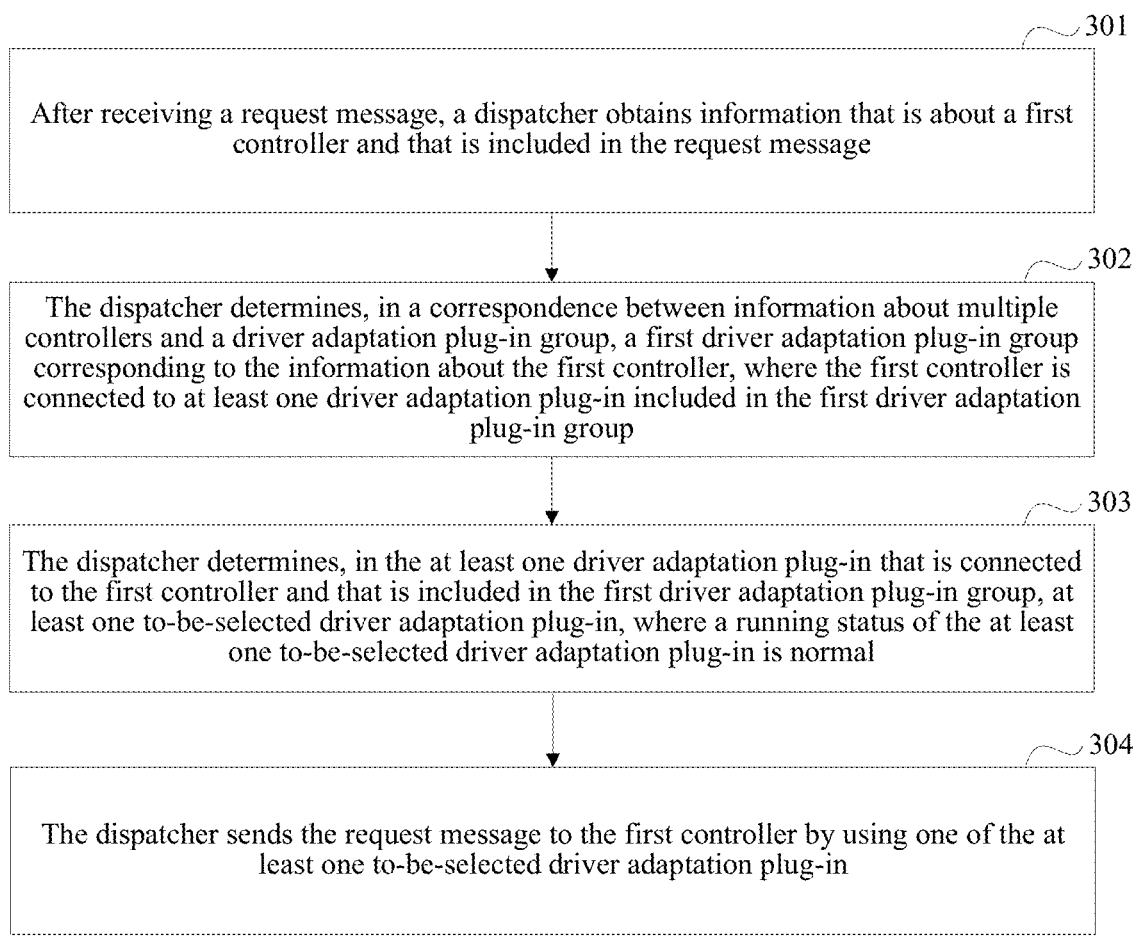
FIG. 3 is a flowchart of a method for transmitting a request message according to an embodiment of the present disclosure.

Referring to FIG. 3, an embodiment of the present disclosure provides a method for transmitting a request message. The method is applicable to the ICT-O system in the ICT network shown in FIG. 1 and FIG. 2. A dispatcher used in this embodiment of the present disclosure is a module that has a distribution function and that is in the ICT-O system. A processing procedure of the method includes the following steps.

Step 301: After receiving a request message, the dispatcher obtains information that is about a first controller and that is included in the request message.

The request message is one of multiple request messages that are obtained by the ICT-O system by decomposing one received service request. Each request message that is obtained by the ICT-O system by means of decomposition includes information about a corresponding target controller. The first controller is the target controller for the request message.

The information about the first controller is information that uniquely identifies the first controller, for example, information such as an identifier of the first controller.

Optionally, the information about the first controller is a route distinguisher of the first controller, and the route distinguisher can uniquely identify the first controller. The route distinguisher of the first controller is generated by the ICT-O system when the first controller registers with the ICT-O system. Optionally, the ICT-O system converts the identifier of the first controller according to a specified rule, to generate the route distinguisher of the first controller.

Step 302: The dispatcher determines, in a correspondence between information about multiple controllers and a driver adaptation plug-in group, a first driver adaptation plug-in group corresponding to the information about the first controller, where the first controller is connected to at least one driver adaptation plug-in included in the first driver adaptation plug-in group.

The correspondence between information about multiple controllers and a driver adaptation plug-in group may be locally stored in the dispatcher, or may be stored in another storage device (for example, a group manager) in the ICT-O system.

It can be learned based on the description about the ICT-O system in FIG. 2 that, the group manager in the ICT-O system may allocate a corresponding driver adaptation plug-in group to each controller in the ICT network, and generate the correspondence between information about multiple controllers and a driver adaptation plug-in group. At least one driver adaptation plug-in included in a driver adaptation plug-in group corresponding to any controller is connected to the controller.

The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in and increasing reliability of transmitting the request message.

Optionally, each driver adaptation plug-in included in the first driver adaptation plug-in group has a same type. Driver adaptation plug-ins may be categorized into different types according to a network type (for example, an SDN or NFV), a device type (for example, an IP device or a wide area network device), a protocol type (for example, the OpenFlow protocol, the Representational State Transfer (REST) protocol, or the Simple Object Access Protocol (SOAP)), and a manufacturer.

For different types of driver adaptation plug-ins, different uniform resource locators (URL) are requested and different interfaces are maintained. Therefore, the at least one driver adaptation plug-in in the first driver adaptation plug-in group has a same type, and an interface of a driver adaptation plug-in of this type matches an interface of the first controller. Optionally, similar to the driver adaptation plug-in, when controllers are also categorized into different types, a type of each driver adaptation plug-in in the first driver adaptation plug-in group matches a type of the first controller.

By means of the foregoing manner, the at least one driver adaptation plug-in in the first driver adaptation plug-in group has a same type, and an interface of a driver adaptation plug-in of the type matches the interface of the first controller. It may be ensured that the dispatcher can successfully transmit the request message to the first controller by using any driver adaptation plug-in included in the first driver adaptation plug-in group, thereby reducing a probability that the request message fails to be transmitted because an interface of a controller does not match an interface of a driver adaptation plug-in and increasing reliability of transmitting the request message.

When the at least one driver adaptation plug-in included in the first driver adaptation plug-in group has different types, the request message further includes a first type of a driver adaptation plug-in.

The first type that is of the driver adaptation plug-in and that is included in the request message indicates that the dispatcher can successfully transmit the request message to the first controller by using a driver adaptation plug-in of only the first type, that is, an interface of the driver adaptation plug-in of the first type matches the interface of the first controller.

By means of the foregoing method, the dispatcher may subsequently select, from the first driver adaptation plug-in group, the at least one to-be-selected driver adaptation plug-in of the first type. It may be ensured that the dispatcher can successfully transmit the request message to the first controller by using any driver adaptation plug-in of the at least one to-be-selected driver adaptation plug-in, thereby reducing a probability that the request message fails to be transmitted because an interface of a controller does not match an interface of a driver adaptation plug-in and increasing reliability of transmitting the request message.

Optionally, in the correspondence between information about multiple controllers and a driver adaptation plug-in group, each of multiple controllers corresponding to the first driver adaptation plug-in group has a same limited connection quantity, and a quantity of driver adaptation plug-ins included in the first driver adaptation plug-in group is less than or equal to the limited connection quantity of each controller corresponding to the first driver adaptation plug-in group.

When a second controller that has a limited connection quantity exists in the ICT network, a quantity of driver adaptation plug-ins included in a driver adaptation plug-in group corresponding to any second controller is less than or equal to the limited connection quantity of the second controller. If multiple second controllers have a same limited connection quantity, the multiple second controllers may correspond to a same driver adaptation plug-in group.

By means of the foregoing method, when the first controller has the limited connection quantity, it may be ensured that the dispatcher can successfully transmit the request message to the first controller by using any driver adaptation plug-in in the first driver adaptation plug-in group in order to avoid a case in which when the quantity of driver adaptation plug-ins included in the first driver adaptation plug-in group is greater than the limited connection quantity of the first controller, the request message fails to be transmitted because the target driver adaptation plug-in selected by the dispatcher is not connected to the first controller, thereby increasing reliability of transmitting the request message.

Optionally, in the correspondence between information about multiple controllers and a driver adaptation plug-in group, a home location of each of the multiple controllers corresponding to the first driver adaptation plug-in group is the same as a home location of each driver adaptation plug-in included in the first driver adaptation plug-in group.

By means of the foregoing method, it may be ensured that the dispatcher can successfully transmit the request message to the first controller by using any driver adaptation plug-in in the first driver adaptation plug-in group in order to avoid a case in which when the first driver adaptation plug-in group includes a driver adaptation plug-in whose home location is different from a home location of the first controller, the request message fails to be transmitted because a home location of the target driver adaptation plug-in selected by the dispatcher is different from the home location of the first controller, thereby increasing reliability of transmitting the request message.

Step 303: The dispatcher determines, in the at least one driver adaptation plug-in that is connected to the first controller and that is included in the first driver adaptation plug-in group, at least one to-be-selected driver adaptation plug-in, where a running status of the at least one to-be-selected driver adaptation plug-in is normal.

In step 303, the dispatcher may determine, in the first driver adaptation plug-in group, the to-be-selected driver adaptation plug-in whose running status is normal in order to select one target driver adaptation plug-in from to-be-selected driver adaptation plug-ins. It may be ensured that the dispatcher can successfully transmit the request message to the first controller by using any driver adaptation plug-in of the at least one to-be-selected driver adaptation plug-in in order to avoid a case in which abnormal running of a driver adaptation plug-in causes a failure in transmitting the request message, thereby increasing reliability of transmitting the request message.

Optionally, when the at least one driver adaptation plug-in included in the first driver adaptation plug-in group has different types, the request message further includes a first type of a driver adaptation plug-in;

before the determining, by the dispatcher, at least one to-be-selected driver adaptation plug-in, the method further includes:

obtaining, by the dispatcher, the first type included in the request message; and the determining, by the dispatcher, at least one to-be-selected driver adaptation plug-in includes:

determining, by the dispatcher, in the at least one driver adaptation plug-in, the at least one to-be-selected driver adaptation plug-in whose type is the same as the first type.

By means of the foregoing method, the dispatcher may subsequently select, from the first driver adaptation plug-in group, the at least one to-be-selected driver adaptation plug-in of the first type. It may be ensured that the dispatcher can successfully transmit the request message to the first controller by using any driver adaptation plug-in of the at least one to-be-selected driver adaptation plug-in, thereby reducing a probability that the request message fails to be transmitted because an interface of a controller does not match an interface of a driver adaptation plug-in, and increasing reliability of transmitting the request message.

Step 304: The dispatcher sends the request message to the first controller by using one of the at least one to-be-selected driver adaptation plug-in.

When a quantity of the at least one to-be-selected driver adaptation plug-in is greater than 1, the performing, by the dispatcher, step 304 includes:

determining, by the dispatcher, a target driver adaptation plug-in by performing load balancing processing on the at least one to-be-selected driver adaptation plug-in, where the target driver adaptation plug-in is one of the at least one to-be-selected driver adaptation plug-in; and sending, by the dispatcher, the request message to the first controller by using the target driver adaptation plug-in.

The dispatcher may use multiple methods of load balancing processing, for example, a method of polling according to a specified sequence, a random selection method, or a method of selection according to a specified characteristic. This is not limited in the present disclosure.

By performing load balancing processing on the at least one to-be-selected driver adaptation plug-in, the dispatcher determines one target driver adaptation plug-in of the at least one to-be-selected driver adaptation plug-in such that load balance of the at least one to-be-selected driver adaptation plug-in can be ensured.

By means of the method for transmitting a request message in the foregoing embodiment of the present disclosure, after receiving a request message, a dispatcher deployed in an ICT-O system determines, according to information that is about a first controller and that is included in the request message, a first driver adaptation plug-in group corresponding to the information about the first controller. The first controller is connected to at least one driver adaptation plug-in included in the first driver adaptation plug-in group. The dispatcher selects, from the at least one driver adaptation plug-in included in the first driver adaptation plug-in group, at least one to-be-selected driver adaptation plug-in whose running status is normal. Eventually, the dispatcher may send the request message to the first controller by using one to-be-selected driver adaptation plug-in. The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in, and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using one of the at least one to-be-selected driver adaptation plug-in in order to avoid a case in which abnormal running of a driver adaptation plug-in causes a failure in transmitting the request message.

Figure 4:
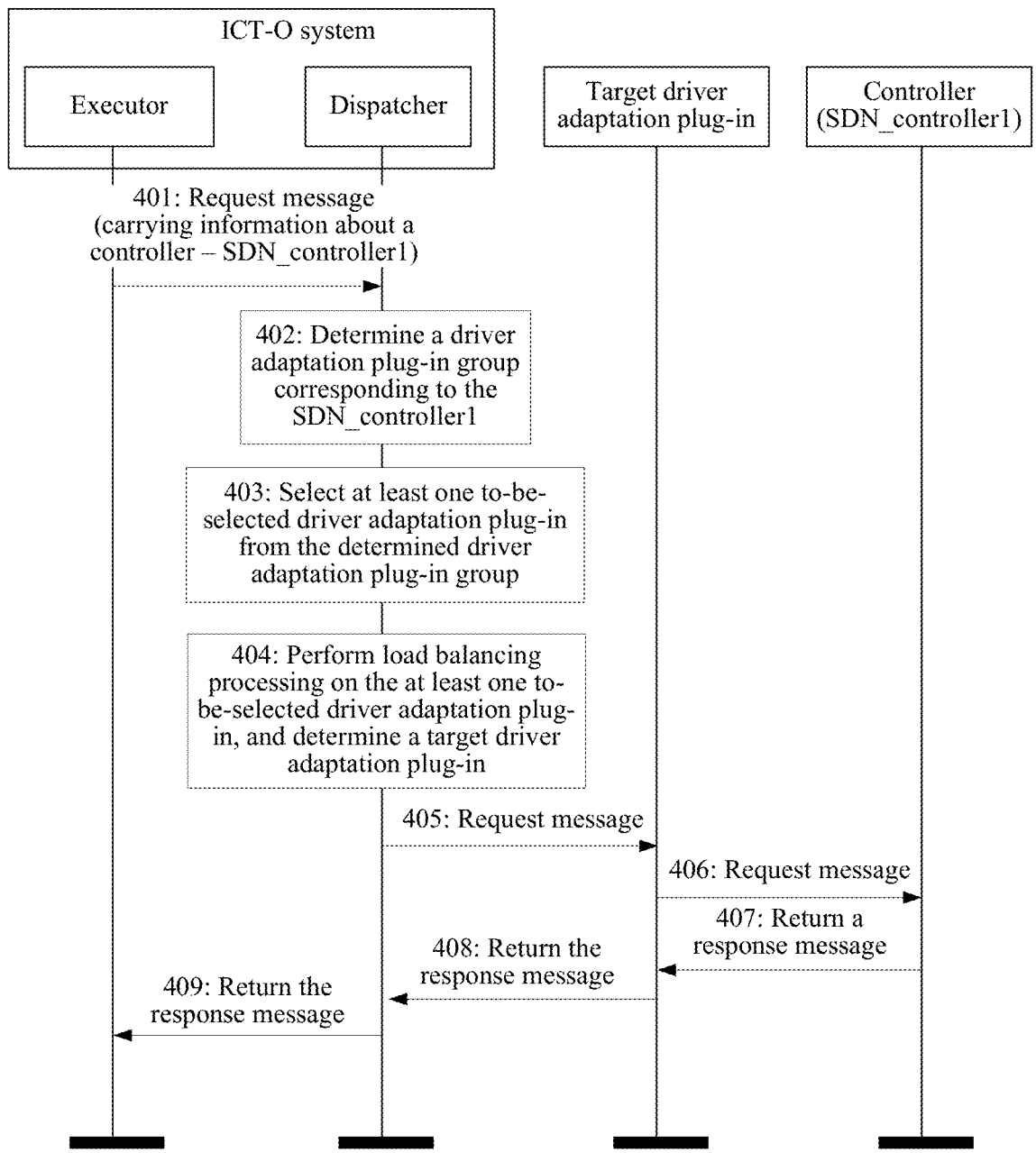
FIG. 4 is a schematic flowchart of an example of transmitting a request message according to an embodiment of the present disclosure.

Based on the foregoing embodiment, an embodiment of the present disclosure provides an example of transmitting a request message. Referring to FIG. 4, an ICT-O system includes an executor and a dispatcher. A procedure of the example includes the following steps.

Step 401: The executor sends a request message to the dispatcher, where the request message carries information, that is, SDN_controller1, about a controller. The request message is one of multiple request messages that are obtained by the ICT-O system by decomposing one service request.

Figure 5:
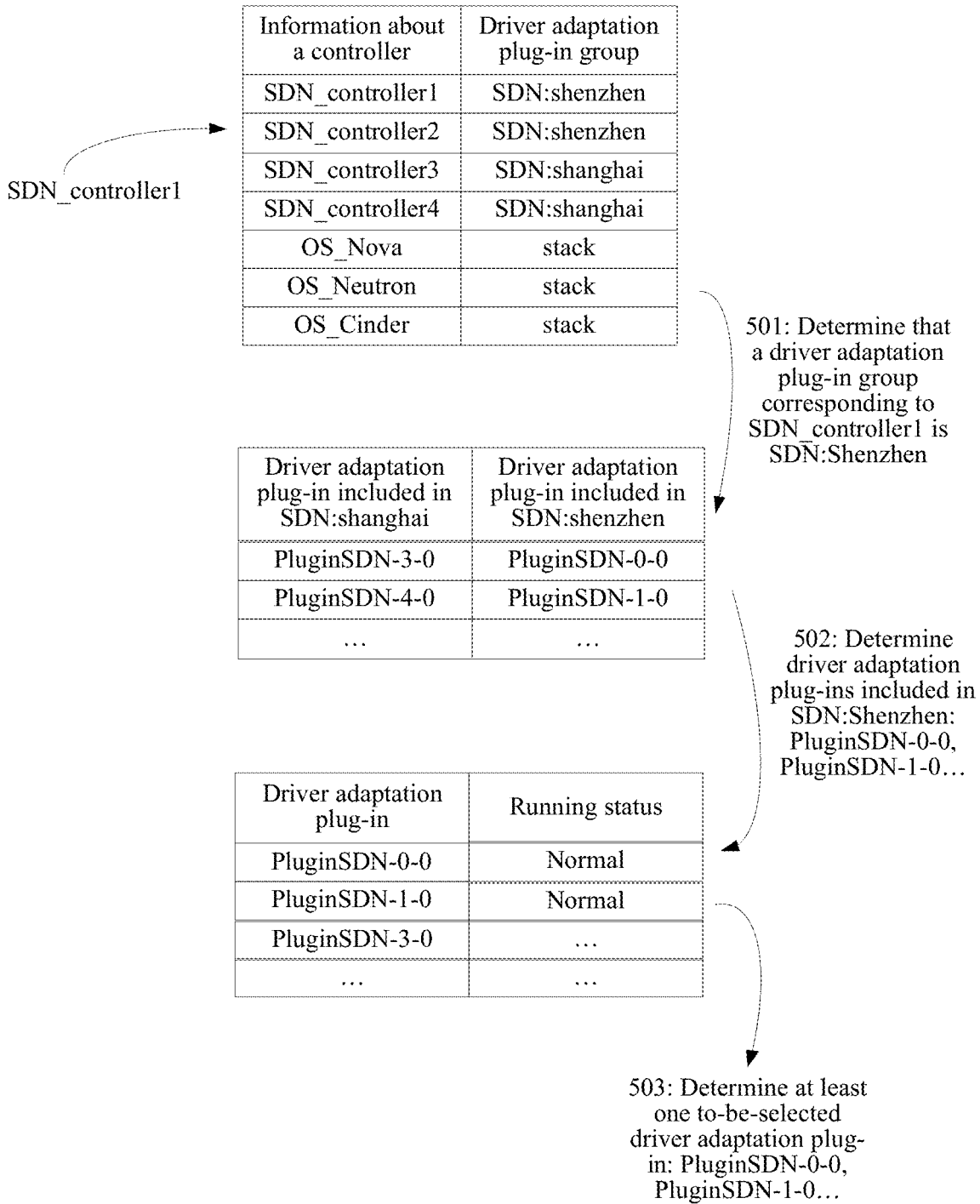
FIG. 5 is a schematic flowchart of a dispatcher determining a to-be-selected driver adaptation plug-in according to an embodiment of the present disclosure.

Step 402: The dispatcher determines, according to SDN_controller1, in a correspondence between information about multiple controllers and a driver adaptation plug-in group, a driver adaptation plug-in group corresponding to SDN_controller1. The determined driver adaptation plug-in group includes at least one driver adaptation plug-in connected to a controller corresponding to SDN_controller1, as shown in step 501 in a procedure of determining, by the dispatcher, a to-be-selected driver adaptation plug-in shown in FIG. 5.

Step 403: The dispatcher selects at least one to-be-selected driver adaptation plug-in from the determined driver adaptation plug-in group, where a running status of the at least one to-be-selected driver adaptation plug-in is normal. As shown in step 502 in FIG. 5, multiple driver adaptation plug-ins in the determined driver adaptation plug-in group are obtained. As further shown in step 503, two to-be-selected driver adaptation plug-ins whose running status is normal are selected from the multiple driver adaptation plug-ins.

Step 404: The dispatcher determines a target driver adaptation plug-in by performing load balancing processing on the at least one to-be-selected driver adaptation plug-in.

Step 405: The dispatcher sends the request message to the target driver adaptation plug-in.

Optionally, when the dispatcher includes a bus and a processing module, after receiving the request message, the bus performs step 402 to step 404 by using the processing module, and returns the target driver adaptation plug-in (that is, an identifier of the target driver adaptation plug-in) to the bus. The bus further performs step 405.

Step 406: The target driver adaptation plug-in sends the request message to the controller corresponding to SDN_controller1.

Step 407: The controller corresponding to SDN_controller1 returns a response message to the target driver adaptation plug-in. Optionally, the response message is an execution result of the request message.

Step 408: The target driver adaptation plug-in returns the response message to the dispatcher.

Step 409: The dispatcher returns the response message to the executor.

In the foregoing example, after receiving a request message, a dispatcher deployed in an ICT-O system determines, according to information that is about a controller and that is included in the request message, a driver adaptation plug-in group corresponding to the information about the controller. The controller is connected to at least one driver adaptation plug-in included in the driver adaptation plug-in group. The dispatcher selects, from the at least one driver adaptation plug-in included in the driver adaptation plug-in group, at least one to-be-selected driver adaptation plug-in whose running status is normal, then determines a target driver adaptation plug-in in the at least one to-be-selected driver adaptation plug-in by performing load balancing processing on the at least one to-be-selected driver adaptation plug-in. Eventually, the dispatcher may send the request message to the controller by using the target driver adaptation plug-in. The at least one driver adaptation plug-in included in the driver adaptation plug-in group is all connected to the controller. Therefore, it is ensured that the dispatcher can successfully transmit the request message to the controller by using any driver adaptation plug-in included in the driver adaptation plug-in group, thereby reducing a probability that the request message fails to be transmitted because a controller is not connected to a driver adaptation plug-in, and increasing reliability of transmitting the request message. In addition, the dispatcher selects, from the at least one driver adaptation plug-in included in the driver adaptation plug-in group, at least one to-be-selected driver adaptation plug-in whose running status is normal. It is further ensured that the dispatcher can successfully transmit the request message to the controller by using a selected target driver adaptation plug-in in order to avoid a case in which abnormal running of a driver adaptation plug-in causes a failure in transmitting the request message.

It can be learned according to the description in the foregoing embodiment that, in the ICT-O system, the correspondence between information about multiple controllers and a driver adaptation plug-in group needs to be maintained. The correspondence between information about multiple controllers and a driver adaptation plug-in group is generated by the ICT-O system. Optionally, the ICT-O system may be the ICT-O system in the ICT network shown in FIG. 1 or FIG. 2. The group manager used in this embodiment of the present disclosure may be the group manager shown in FIG. 2.

Figure 6:
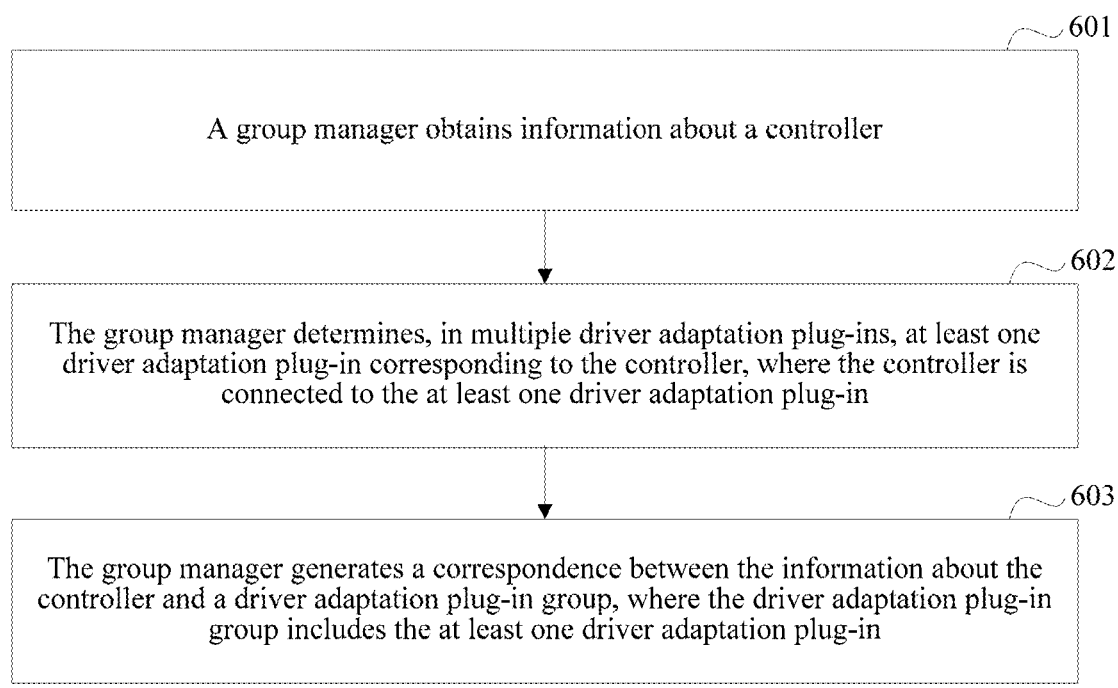
FIG. 6 is a flowchart of a method for generating a correspondence between information about a controller and a driver adaptation plug-in group according to an embodiment of the present disclosure.

Referring to FIG. 6, an embodiment of the present disclosure further provides a method for generating a correspondence between information about a controller and a driver adaptation plug-in group. A procedure of the method includes the following steps.

Step 601: A group manager obtains information about a controller.

The information about the controller may be information that uniquely identifies the controller, for example, information such as an identifier of the controller.

Optionally, the information about the controller is a route distinguisher of the controller, and the route distinguisher can uniquely identify the controller. The route distinguisher of the controller is generated by the ICT-O system when the controller registers with the ICT-O system. Optionally, the ICT-O system converts the identifier of the controller according to a specified rule, to generate the route distinguisher of the controller.

Step 602: The group manager determines, in multiple driver adaptation plug-ins, at least one driver adaptation plug-in corresponding to the controller, where the controller is connected to the at least one driver adaptation plug-in.

Optionally, the determining, by the group manager, in multiple driver adaptation plug-ins, at least one driver adaptation plug-in corresponding to the controller includes:

obtaining, by the group manager, a type of each driver adaptation plug-in of the multiple driver adaptation plug-ins; and determining, by the group manager, from the multiple driver adaptation plug-ins, the at least one driver adaptation plug-in having a same type.

For different types of driver adaptation plug-ins, different uniform resource locators (URL) are requested and different interfaces are maintained. Therefore, the group manager determines an interface that is of a driver adaptation plug-in and that matches an interface of the controller, then determines a type of the driver adaptation plug-in, and eventually determines that an interface of a driver adaptation plug-in of this type matches the interface of the controller. Therefore, the group manager may select, from multiple driver adaptation plug-ins, the at least one driver adaptation plug-in having a same type (that is, of this type). Optionally, similar to the driver adaptation plug-in, when controllers are also categorized into different types, the group manager selects the at least one driver adaptation plug-in from a first driver adaptation plug-in group in which a type of each driver adaptation plug-in matches the type of the controller.

By means of the foregoing manner, the selected at least one driver adaptation plug-in has a same type, and an interface of a driver adaptation plug-in of the type matches the interface of the controller. Subsequently, it may be ensured that a dispatcher can successfully transmit a request message to the first controller by using any of the at least one driver adaptation plug-in, thereby reducing a probability that the request message fails to be transmitted because an interface of a controller does not match an interface of a driver adaptation plug-in, and increasing reliability of transmitting the request message.

Optionally, a quantity of the at least one driver adaptation plug-in is less than or equal to a limited connection quantity of the controller.

By means of the foregoing method, when the controller has the limited connection quantity, it may be ensured that the dispatcher can successfully transmit the request message to the controller by using any of the at least one driver adaptation plug-in in order to avoid a case in which when the quantity of the at least one driver adaptation plug-in is greater than the limited connection quantity of the controller, the request message fails to be transmitted because the target driver adaptation plug-in selected by the dispatcher is not connected to the controller, thereby increasing reliability of transmitting the request message.

Optionally, a home location of the at least one driver adaptation plug-in is the same as a home location of the controller.

By means of the foregoing method, it may be ensured that the dispatcher can successfully transmit the request message to the controller by using any of the at least one driver adaptation plug-in in order to avoid a case in which when the at least one driver adaptation plug-in includes a driver adaptation plug-in whose home location is different from a home location of the controller, the request message fails to be transmitted because a home location of the target driver adaptation plug-in selected by the dispatcher is different from the home location of the controller, thereby increasing reliability of transmitting the request message.

Step 603: The group manager generates a correspondence between the information about the controller and a driver adaptation plug-in group, where the driver adaptation plug-in group includes the at least one driver adaptation plug-in.

After the group manager generates the correspondence between the information about the controller and a driver adaptation plug-in group, efficiency of to subsequently searching for the at least one driver adaptation plug-in corresponding to the controller by the dispatcher can be increased. In addition, the group manager conveniently manages and controls the correspondence between the information about the controller and a driver adaptation plug-in group.

Optionally, after the group manager generates the correspondence between the information about the controller and a driver adaptation plug-in group, the method further includes:

obtaining, by the group manager, a running status of the at least one driver adaptation plug-in. Optionally, the group manager may periodically obtain the running status of the at least one driver adaptation plug-in. Alternatively, the at least one driver adaptation plug-in may periodically report a running status of the at least one driver adaptation plug-in. Alternatively, the at least one driver adaptation plug-in may report a current running status of the at least one driver adaptation plug-in when determining that a running status of the at least one driver adaptation plug-in changes. This is not limited in the present disclosure.

By means of the foregoing method, the group manager may determine a running status of each driver adaptation plug-in in the driver adaptation plug-in group corresponding to the controller. Subsequently, when determining a to-be-selected driver adaptation plug-in, the dispatcher may select, from the at least one driver adaptation plug-in according to the running status that is of the at least one driver adaptation plug-in and that is obtained by the group manager, at least one to-be-selected driver adaptation plug-in whose running status is normal.

Optionally, the group manager further needs to perform later maintenance on the generated correspondence between the information about the controller and a driver adaptation plug-in group. For example, when the controller is deregistered, the group manager deletes the correspondence between the information about the controller and a driver adaptation plug-in group. When a driver adaptation plug-in in the driver adaptation plug-in group is deregistered, the group manager deletes the deregistered driver adaptation plug-in in the driver adaptation plug-in group corresponding to the controller. When the dispatcher fails to send a request message to the controller according to a target driver adaptation plug-in in the driver adaptation plug-in group, the group manager may alternatively delete the target driver adaptation plug-in in the driver adaptation plug-in group corresponding to the controller.

Optionally, the group manager may generate, by using the foregoing method, each correspondence of the correspondence between information about multiple controllers and a driver adaptation plug-in group. Optionally, the group manager may periodically update a correspondence between information about multiple control cores and a driver adaptation plug-in group. When one controller or one driver adaptation plug-in registers with the ICT-O system, the group manager generates, for the controller or the driver adaptation plug-in that is registered, the correspondence between the information about the controller and a driver adaptation plug-in group. This is not limited in the present disclosure.

The group manager selects a driver adaptation plug-in according to a type of the driver adaptation plug-in, and then generates the correspondence between the information about the controller and a driver adaptation plug-in group. In this case, when a controller of a new type is developed, the dispatcher does not need to modify or adjust an original driver adaptation plug-in in the ICT network. Therefore, a service is not interrupted, and by using the correspondence that is between the information about the controller and a driver adaptation plug-in group and that is generated by the group manager for the controller, the dispatcher may select one target driver adaptation plug-in from the driver adaptation plug-in group corresponding to the controller, to send a request message to the controller, thereby reducing a service processing delay and improving user experience.

By means of the method for generating a correspondence between information about a controller and a driver adaptation plug-in group provided in this embodiment of the present disclosure, after obtaining information about a controller in an ICT network, a group manager deployed in an ICT-O system determines, in multiple driver adaptation plug-ins in the ICT network, at least one driver adaptation plug-in connected to the controller, and establishes a correspondence between the information about the controller and a driver adaptation plug-in group. The driver adaptation plug-in group includes the at least one driver adaptation plug-in. In this way, the at least one driver adaptation plug-in included in the driver adaptation plug-in group is all connected to the controller. Therefore, it is ensured that a dispatcher can successfully transmit a request message to the controller by using any driver adaptation plug-in included in the driver adaptation plug-in group, thereby reducing a probability that the request message fails to be transmitted because a controller is not connected to a driver adaptation plug-in, and increasing reliability of transmitting the request message.

Figure 7:
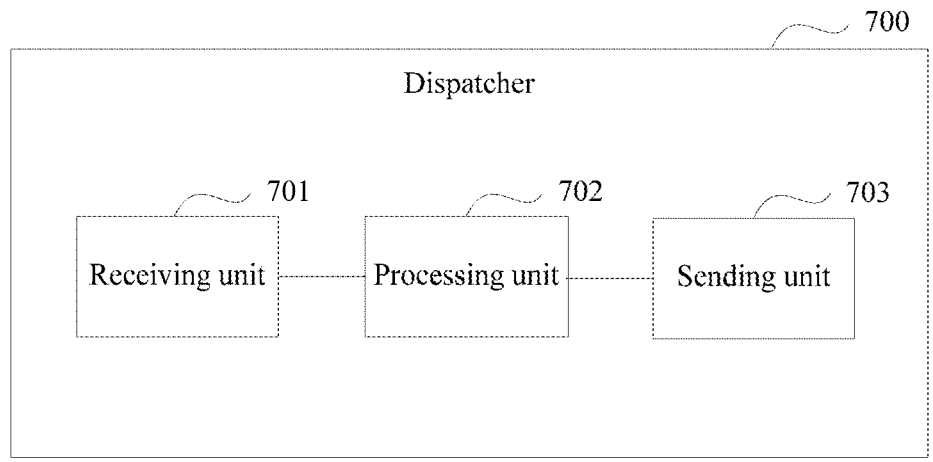
FIG. 7 is a schematic structural diagram of a dispatcher according to an embodiment of the present disclosure.

Based on the foregoing embodiments, the present disclosure further provides a dispatcher. The dispatcher may be a module that has a distribution function and that is in the ICT-O system in the ICT network shown in FIG. 1 and FIG. 2. As shown in FIG. 7, the dispatcher 700 includes: a receiving unit 701, a processing unit 702, and a sending unit 703, where the receiving unit 701 is configured to receive a request message;

the processing unit 702 is configured to: obtain information that is about a first controller and that is included in the request message;

determine, in a correspondence between information about multiple controllers and a driver adaptation plug-in group, a first driver adaptation plug-in group corresponding to the information about the first controller, where the first controller is connected to at least one driver adaptation plug-in included in the first driver adaptation plug-in group; and determine, in the at least one driver adaptation plug-in that is connected to the first controller and that is included in the first driver adaptation plug-in group, at least one to-be-selected driver adaptation plug-in, where a running status of the at least one to-be-selected driver adaptation plug-in is normal; and the sending unit 703 is configured to send the request message to the first controller by using one of the at least one to-be-selected driver adaptation plug-in.

Optionally, the information about the first controller is a route distinguisher of the first controller, and the route distinguisher can uniquely identify the first controller.

Optionally, each driver adaptation plug-in included in the first driver adaptation plug-in group has a same type.

Optionally, the request message further includes a first type of a driver adaptation plug-in;

the processing unit 702 is further configured to:

before determining, in the at least one driver adaptation plug-in that is connected to the first controller and that is included in the first driver adaptation plug-in group, the at least one to-be-selected driver adaptation plug-in, obtain the first type included in the request message; and when determining, in the at least one driver adaptation plug-in that is connected to the first controller and that is included in the first driver adaptation plug-in group, the at least one to-be-selected driver adaptation plug-in, the processing unit 702 is specifically configured to:

determine, in the at least one driver adaptation plug-in, the at least one to-be-selected driver adaptation plug-in whose type is the same as the first type and whose running status is normal.

Optionally, in the correspondence between information about multiple controllers and a driver adaptation plug-in group, each of multiple controllers corresponding to the first driver adaptation plug-in group has a same limited connection quantity, and a quantity of driver adaptation plug-ins included in the first driver adaptation plug-in group is less than or equal to the limited connection quantity of each controller corresponding to the first driver adaptation plug-in group.

Optionally, in the correspondence between information about multiple controllers and a driver adaptation plug-in group, a home location of each of the multiple controllers corresponding to the first driver adaptation plug-in group is the same as a home location of each driver adaptation plug-in included in the first driver adaptation plug-in group.

Optionally, when a quantity of the at least one to-be-selected driver adaptation plug-in is greater than 1, the processing unit 702 is further configured to:

after determining, in the at least one driver adaptation plug-in that is connected to the first controller and that is included in the first driver adaptation plug-in group, the multiple to-be-selected driver adaptation plug-ins, and before the sending unit sends the request message to the first controller by using one of the at least one to-be-selected driver adaptation plug-in, determine a target driver adaptation plug-in by performing load balancing processing on the multiple to-be-selected driver adaptation plug-ins, where the target driver adaptation plug-in is one of the multiple to-be-selected driver adaptation plug-ins; and the sending unit 703 is specifically configured to:

send the request message to the first controller by using the target driver adaptation plug-in.

By means of the dispatcher provided in this embodiment of the present disclosure, the dispatcher determines, according to information that is about a first controller and that is included in a request message, a first driver adaptation plug-in group corresponding to the information about the first controller. The first controller is connected to at least one driver adaptation plug-in included in the first driver adaptation plug-in group. The dispatcher selects, from the at least one driver adaptation plug-in included in the first driver adaptation plug-in group, at least one to-be-selected driver adaptation plug-in whose running status is normal. Eventually, the dispatcher may send the request message to the first controller by using one to-be-selected driver adaptation plug-in. The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in, and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using one of the at least one to-be-selected driver adaptation plug-in in order to avoid a case in which abnormal running of a driver adaptation plug-in causes a failure in transmitting the request message.

Figure 8:
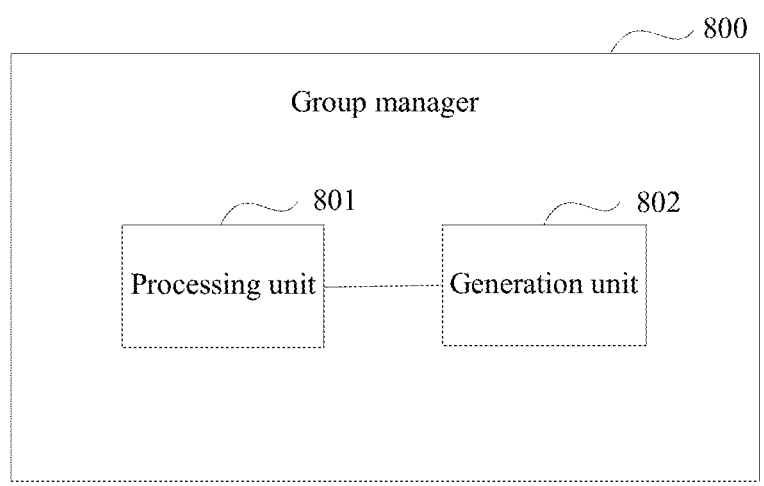
FIG. 8 is a schematic structural diagram of a group manager according to an embodiment of the present disclosure.

Based on the foregoing embodiments, the present disclosure further provides a group manager. The group manager may be applied to the ICT-O system in the ICT network shown in FIG. 1 and FIG. 2. The group manager has a function of generating a correspondence between information about a controller and a driver adaptation plug-in group. Referring to FIG. 8, the group manager 800 includes: a processing unit 801 and a generation unit 802, where the processing unit 801 is configured to: obtain information about a controller; and determine, in multiple driver adaptation plug-ins, at least one driver adaptation plug-in corresponding to the controller, where the controller is connected to the at least one driver adaptation plug-in; and the generation unit 802 is configured to generate a correspondence between the information about the controller and a driver adaptation plug-in group, where the driver adaptation plug-in group includes the at least one driver adaptation plug-in.

Optionally, the information about the controller is a route distinguisher of the controller, and the route distinguisher can uniquely identify the controller.

Optionally, the processing unit 801 is specifically configured to:

obtain a type of each driver adaptation plug-in of the multiple driver adaptation plug-ins; and determine, in the multiple driver adaptation plug-ins, the at least one driver adaptation plug-in having a same type.

Optionally, a quantity of the at least one driver adaptation plug-in is less than or equal to a limited connection quantity of the controller.

Optionally, a home location of the at least one driver adaptation plug-in is the same as a home location of the controller.

Optionally, the processing unit 801 is further configured to:

after the generation unit 802 generates the correspondence between the information about the controller and a driver adaptation plug-in group, obtain a running status of the at least one driver adaptation plug-in.

By means of the group manager provided in this embodiment of the present disclosure, after obtaining information about a controller in an ICT network, the group manager selects, from multiple driver adaptation plug-ins in the ICT network, at least one driver adaptation plug-in connected to the controller, and establishes a correspondence between the information about the controller and a driver adaptation plug-in group. The driver adaptation plug-in group includes the at least one driver adaptation plug-in. In this way, the at least one driver adaptation plug-in included in the driver adaptation plug-in group is all connected to the controller. Therefore, it is ensured that a dispatcher can successfully transmit a request message to the controller by using any driver adaptation plug-in included in the driver adaptation plug-in group, thereby reducing a probability that the request message fails to be transmitted because a controller is not connected to a driver adaptation plug-in, and increasing reliability of transmitting the request message.

It should be noted that, division of the units in this embodiment of the present disclosure is an example and is only division according to logical functions. Another division manner may be used during actual implementation. Functional units in this embodiment of this application may be integrated into one processing unit, or each unit may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 9:
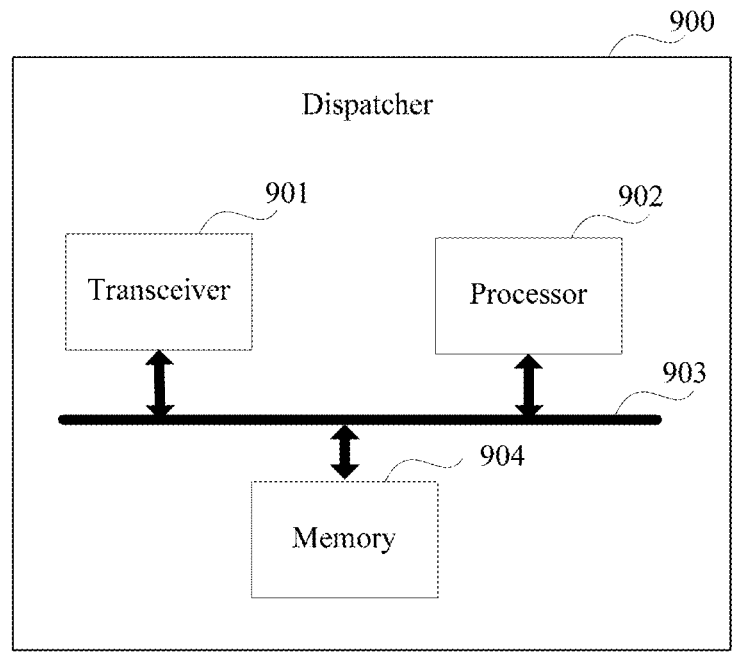
FIG. 9 is a structural diagram of a dispatcher according to an embodiment of the present disclosure.

Based on the foregoing embodiments, this embodiment of the present disclosure further provides a dispatcher. The dispatcher may be a device that has a distribution function and that is in the ICT-O system in the ICT network shown in FIG. 1 and FIG. 2. Referring to FIG. 9, the dispatcher 900 includes: a transceiver 901, a processor 902, a bus 903, and a memory 904.

The transceiver 901, the processor 902, and the memory 904 are connected to each other by using the bus 903. The bus 903 may be a peripheral component interconnect (PCI) bus, an extended industry standard architecture (EISA) bus, or the like. The bus may be classified into an address bus, a data bus, a control bus, or the like. For ease of representation, the bus is represented in FIG. 9 by using only one bold line, but it does not indicate that there is only one bus or only one type of bus.

The transceiver 901 is configured to communicate and interact with another device connected to the dispatcher 900.

The processor 902 is configured to implement the method for transmitting a request message shown in FIG. 3, where the method includes:

after a request message is received, obtaining information that is about a first controller and that is included in the request message;

determining, in a correspondence between information about multiple controllers and a driver adaptation plug-in group, a first driver adaptation plug-in group corresponding to the information about the first controller, where the first controller is connected to at least one driver adaptation plug-in included in the first driver adaptation plug-in group; and determining, in the at least one driver adaptation plug-in that is connected to the first controller and that is included in the first driver adaptation plug-in group, at least one to-be-selected driver adaptation plug-in, where a running status of the at least one to-be-selected driver adaptation plug-in is normal; and sending the request message to the first controller by using one of the at least one to-be-selected driver adaptation plug-in.

Optionally, the information about the first controller is a route distinguisher of the first controller, and the route distinguisher can uniquely identify the first controller.

Optionally, each driver adaptation plug-in included in the first driver adaptation plug-in group has a same type.

Optionally, the request message further includes a first type of a driver adaptation plug-in;

the processor 902 is further configured to:

before determining, in the at least one driver adaptation plug-in that is connected to the first controller and that is included in the first driver adaptation plug-in group, the at least one to-be-selected driver adaptation plug-in, obtain the first type included in the request message; and when determining, in the at least one driver adaptation plug-in that is connected to the first controller and that is included in the first driver adaptation plug-in group, the at least one to-be-selected driver adaptation plug-in, the processor 902 is specifically configured to:

determine, in the at least one driver adaptation plug-in, the at least one to-be-selected driver adaptation plug-in whose type is the same as the first type and whose running status is normal.

Optionally, in the correspondence between information about multiple controllers and a driver adaptation plug-in group, each of multiple controllers corresponding to the first driver adaptation plug-in group has a same limited connection quantity, and a quantity of driver adaptation plug-ins included in the first driver adaptation plug-in group is less than or equal to the limited connection quantity of each controller corresponding to the first driver adaptation plug-in group.

Optionally, in the correspondence between information about multiple controllers and a driver adaptation plug-in group, a home location of each of the multiple controllers corresponding to the first driver adaptation plug-in group is the same as a home location of each driver adaptation plug-in included in the first driver adaptation plug-in group.

Optionally, when a quantity of the at least one to-be-selected driver adaptation plug-in is greater than 1, when sending the request message to the first controller by using one of the at least one to-be-selected driver adaptation plug-in, the processor 902 is specifically configured to:

determine a target driver adaptation plug-in by performing load balancing processing on the multiple to-be-selected driver adaptation plug-ins, where the target driver adaptation plug-in is one of the multiple to-be-selected driver adaptation plug-ins; and send the request message to the first controller by using the target driver adaptation plug-in.

The memory 904 is configured to store a program, or the like. Specifically, the program may include program code, where the program code includes a computer operation instruction. The memory 904 may include a volatile memory, such as a random-access memory (RAM); or the memory may be a non-volatile memory, such as a read-only memory (ROM), a flash memory, a hard disk drive (HDD), or a solid-state drive (SD); or the memory is any other medium that can be used to carry or store expected program code that has an instruction or data structure form and that can be accessed by a computer, but is not limited thereto. The memory may be a combination of the foregoing memories. The processor 902 executes an application program stored in the memory 904, and implements the foregoing functions in order to implement the method for transmitting a request message shown in FIG. 3.

By means of the dispatcher provided in this embodiment of the present disclosure, the dispatcher determines, according to information that is about a first controller and that is included in a request message, a first driver adaptation plug-in group corresponding to the information about the first controller. The first controller is connected to at least one driver adaptation plug-in included in the first driver adaptation plug-in group. The dispatcher selects, from the at least one driver adaptation plug-in included in the first driver adaptation plug-in group, at least one to-be-selected driver adaptation plug-in whose running status is normal. Eventually, the dispatcher may send the request message to the first controller by using one to-be-selected driver adaptation plug-in. The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in, and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using one of the at least one to-be-selected driver adaptation plug-in in order to avoid a case in which abnormal running of a driver adaptation plug-in causes a failure in transmitting the request message.

Figure 10:
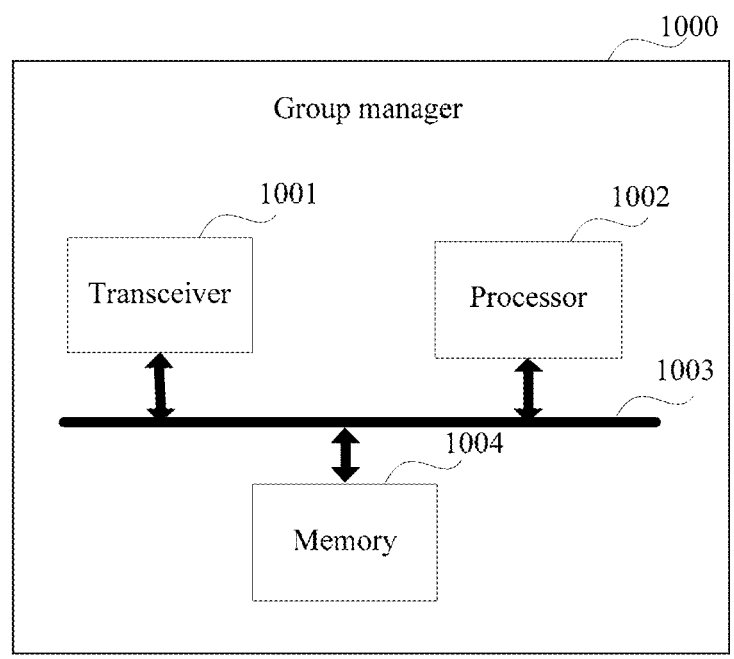
FIG. 10 is a structural diagram of a group manager according to an embodiment of the present disclosure.

Based on the foregoing embodiments, this embodiment of the present disclosure further provides a group manager. The group manager may be in the ICT-O system in the ICT network shown in FIG. 1 and FIG. 2. The group manager has a function of generating a correspondence between information about a controller and a driver adaptation plug-in group. Referring to FIG. 10, the group manager 1000 includes: a transceiver 1001, a processor 1002, a bus 1003, and a memory 1004.

The transceiver 1001, the processor 1002, and the memory 1004 are connected to each other by using the bus 1003. The bus 1003 may be a peripheral component interconnect (PCI) bus, an extended industry standard architecture (EISA) bus, or the like. The bus may be classified into an address bus, a data bus, a control bus, or the like. For ease of representation, the bus is represented in FIG. 10 by using only one bold line, but it does not indicate that there is only one bus or only one type of bus.

The transceiver 1001 is configured to communicate and interact with another device connected to the group manager.

The processor 1002 is configured to implement the method for generating a correspondence between information about a controller and a driver adaptation plug-in group shown in FIG. 6, where the method includes:

obtaining information about a controller;

determining, in multiple driver adaptation plug-ins, at least one driver adaptation plug-in corresponding to the controller, where the controller is connected to the at least one driver adaptation plug-in; and generating a correspondence between the information about the controller and a driver adaptation plug-in group, where the driver adaptation plug-in group includes the at least one driver adaptation plug-in.

Optionally, the information about the controller is a route distinguisher of the controller, and the route distinguisher can uniquely identify the controller.

Optionally, when determining, in the multiple driver adaptation plug-ins, the at least one driver adaptation plug-in corresponding to the controller, the processor 1002 is specifically configured to:

obtain a type of each driver adaptation plug-in group of the multiple driver adaptation plug-ins; and determine, in the multiple driver adaptation plug-ins, the at least one driver adaptation plug-in having a same type.

Optionally, a quantity of the at least one driver adaptation plug-in is less than or equal to a limited connection quantity of the controller.

Optionally, a home location of the at least one driver adaptation plug-in is the same as a home location of the controller.

Optionally, the processor 1002 is further configured to:

after generating the correspondence between the information about the controller and a driver adaptation plug-in group, obtain a running status of the at least one driver adaptation plug-in.

The memory 1004 is configured to store a program, or the like. Specifically, the program may include program code, where the program code includes a computer operation instruction. The memory 1004 may include a volatile memory, such as a random-access memory (RAM); or the memory may be a non-volatile memory, such as a read-only memory (ROM), a flash memory, a hard disk drive (HDD), or a solid-state drive (SSD); or the memory is any other medium that can be used to carry or store expected program code that has an instruction or data structure form and that can be accessed by a computer, but is not limited thereto. The memory may be a combination of the foregoing memories. The processor 1002 executes an application program stored in the memory 1004, to implement the foregoing functions in order to implement the method for generating a correspondence between information about a controller and a driver adaptation plug-in group shown in FIG. 6.

By means of the group manager provided in this embodiment of the present disclosure, after obtaining information about a controller in an ICT network, the group manager selects, from multiple driver adaptation plug-ins in the ICT network, at least one driver adaptation plug-in connected to the controller, and establishes a correspondence between the information about the controller and a driver adaptation plug-in group. The driver adaptation plug-in group includes the at least one driver adaptation plug-in. In this way, the at least one driver adaptation plug-in included in the driver adaptation plug-in group is all connected to the controller. Therefore, it is ensured that a dispatcher can successfully transmit a request message to the controller by using any driver adaptation plug-in included in the driver adaptation plug-in group, thereby reducing a probability that the request message fails to be transmitted because a controller is not connected to a driver adaptation plug-in, and increasing reliability of transmitting the request message.

This embodiment of the present disclosure provides a method for transmitting a request message and an apparatus. In the method, after receiving a request message, a dispatcher deployed in an ICT-O system determines, according to information that is about a first controller and that is included in the request message, a first driver adaptation plug-in group corresponding to the information about the first controller. The first controller is connected to at least one driver adaptation plug-in included in the first driver adaptation plug-in group. The dispatcher selects, from the at least one driver adaptation plug-in included in the first driver adaptation plug-in group, at least one to-be-selected driver adaptation plug-in whose running status is normal. Eventually, the dispatcher may send the request message to the first controller by using one to-be-selected driver adaptation plug-in. The at least one driver adaptation plug-in included in the first driver adaptation plug-in group is all connected to the first controller. Therefore, it is ensured that the dispatcher can successfully transmit the request message to the first controller by using any driver adaptation plug-in included in the first driver adaptation plug-in group, thereby reducing a probability that the request message fails to be transmitted because a controller is not connected to a driver adaptation plug-in, and increasing reliability of transmitting the request message. In addition, the dispatcher selects, from the at least one driver adaptation plug-in included in the first driver adaptation plug-in group, at least one to-be-selected driver adaptation plug-in whose running status is normal. It is further ensured that the dispatcher can successfully transmit the request message to the first controller by using a selected target driver adaptation plug-in in order to avoid a case in which abnormal running of a driver adaptation plug-in causes a failure in transmitting the request message.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for transmitting a service request message, the method comprising:
receiving, by a dispatcher a service request message, and obtaining information about a first controller from the service request message;
determining, by the dispatcher, a first driver adaptation plug-in group from a data structure indicating a correspondence between information about multiple controllers and a driver adaptation plug-in group, based on the information about the first controller, the first driver adaptation plug-in group having at least one driver adaptation plug-in connected to the first controller;
determining, by the dispatcher, from the at least one driver adaptation plug-in connected to the first controller, at least one to-be-selected driver adaptation plug-in having a running status indicated as normal; and
sending, by the dispatcher, the service request message to the first controller by using one of the at least one to-be-selected driver adaptation plug-in.

2. The method according to claim 1, wherein the information about the first controller is a route distinguisher that can uniquely identifies the first controller.

3. The method according to claim 1, wherein each driver adaptation plug-in comprised in the first driver adaptation plug-in group has a same type.

4. The method according to claim 1, wherein:
the service request message further comprises a first type of a driver adaptation plug-in;
before determining, by the dispatcher, from the at least one driver adaptation plug-in connected to the first controller, at least one to-be-selected driver adaptation plug-in, the method further comprises:
obtaining, by the dispatcher, the first type comprised in the request message; and
determining, by the dispatcher, from the at least one driver adaptation plug-in connected to the first controller, at least one to-be-selected driver adaptation plug-in comprises:
determining, by the dispatcher, from the at least one driver adaptation plug-in, the at least one to-be-selected driver adaptation plug-in whose type is the same as the first type and whose running status is normal.

5. The method according to claim 1, wherein in the correspondence between information about the multiple controllers and the driver adaptation plug-in group, each of the multiple controllers corresponding to the first driver adaptation plug-in group has a same limited connection quantity, and a quantity of driver adaptation plug-ins comprised in the first driver adaptation plug-in group is less than or equal to the limited connection quantity of each controller corresponding to the first driver adaptation plug-in group.

6. The method according to claim 1, wherein in the correspondence between information about the multiple controllers and the driver adaptation plug-in group, a home location of each of the multiple controllers corresponding to the first driver adaptation plug-in group is the same as a home location of each driver adaptation plug-in comprised in the first driver adaptation plug-in group.

7. The method according to claim 1, wherein when a quantity of the at least one to-be-selected driver adaptation plug-in is greater than 1, sending, by the dispatcher, the service request message to the first controller by using one of the at least one to-be-selected driver adaptation plug-in comprises:
determining, by the dispatcher, a target driver adaptation plug-in by performing load balancing processing on the multiple to-be-selected driver adaptation plug-ins, wherein the target driver adaptation plug-in is one of the multiple to-be-selected driver adaptation plug-ins; and
sending, by the dispatcher, the service request message to the first controller by using the target driver adaptation plug-in.

8. A method for generating a correspondence between information about a controller and a driver adaptation plug-in group, the method comprising:

obtaining, by a group manager, information about a controller;

determining, by the group manager, from multiple driver adaptation plug-ins, at least one driver adaptation plug-in corresponding to the controller, wherein the controller is connected to the at least one driver adaptation plug-in; and generating, by the group manager, a data structure indicating a correspondence between the information about the controller and a driver adaptation plug-in group, wherein the driver adaptation plug-in group comprises the at least one driver adaptation plug-in.

9. The method according to claim 8, wherein the information about the controller is a route distinguisher that uniquely identifies the first controller.

10. The method according to claim 8, wherein determining, by the group manager, in multiple driver adaptation plug-ins, at least one driver adaptation plug-in corresponding to the controller comprises:

obtaining, by the group manager, a type of each driver adaptation plug-in of the multiple driver adaptation plug-ins; and determining, by the group manager, from the multiple driver adaptation plug-ins, the at least one driver adaptation plug-in having a same type.

11. The method according to claim 8, wherein a quantity of the at least one driver adaptation plug-in is less than or equal to a limited connection quantity of the controller.

12. The method according to claim 8, wherein a home location of the at least one driver adaptation plug-in is the same as a home location of the controller.

13. The method according to claim 8, wherein after generating, by the group manager, the correspondence between the information about the controller and the driver adaptation plug-in group, the method further comprises:

obtaining, by the group manager, a running status of the at least one driver adaptation plug-in.

14. A dispatcher, comprising:
a memory for storing executable program code;
a communications interface; and
at least one processor connected to the memory and the communications interface, wherein the executable program code, when executed by the at least one processor, causes the dispatcher to:
receive a service request message,
obtain information about a first controller from the service request message,
determine a first driver adaptation plug-in group from a data structure indicating a correspondence between information about multiple controllers and a driver adaptation plug-in group, based on the information about the first controller, the first driver adaptation plug-in group having at least one driver adaptation plug-in connected to the first controller, and
determine, from the at least one driver adaptation plug-in connected to the first controller, at least one to-be-selected driver adaptation plug-in having a running status indicated as normal; and send the service request message to the first controller by using one of the at least one to-be-selected driver adaptation plug-in.

15. The dispatcher according to claim 14, wherein the information about the first controller is a route distinguisher that uniquely identifies the first controller.

16. The dispatcher according to claim 14, wherein each driver adaptation plug-in comprised in the first driver adaptation plug-in group has a same type.

17. The dispatcher according to claim 14, wherein:
the service request message further comprises a first type of a driver adaptation plug-in; and
wherein the executable program code, when executed by the at least one processor, causes the dispatcher to:
before determining, in the at least one driver adaptation plug-in connected to the first controller, the at least one to-be-selected driver adaptation plug-in, obtain the first type comprised in the service request message, and
when determining, in the at least one driver adaptation plug-in connected to the first controller, the at least one to-be-selected driver adaptation plug-in, determine, in the at least one driver adaptation plug-in, the at least one to-be-selected driver adaptation plug-in whose type is the same as the first type and whose running status is normal.

18. The dispatcher according to claim 14, wherein in the correspondence between information about the multiple controllers and the driver adaptation plug-in group, each of the multiple controllers corresponding to the first driver adaptation plug-in group has a same limited connection quantity, and a quantity of driver adaptation plug-ins comprised in the first driver adaptation plug-in group is less than or equal to the limited connection quantity of each controller corresponding to the first driver adaptation plug-in group.

19. The dispatcher according to claim 14, wherein in the correspondence between information about the multiple controllers and the driver adaptation plug-in group, a home location of each of the multiple controllers corresponding to the first driver adaptation plug-in group is the same as a home location of each driver adaptation plug-in comprised in the first driver adaptation plug-in group.

20. The dispatcher according to claim 14, wherein when a quantity of the at least one to-be-selected driver adaptation plug-in is greater than 1, the executable program code, when executed by the at least one processor, causes the dispatcher to:
after determining, in the at least one driver adaptation plug-in connected to the first controller, the multiple to-be-selected driver adaptation plug-ins, and before sending the service request message to the first controller by using one of the at least one to-be-selected driver adaptation plug-in, determine a target driver adaptation plug-in by performing load balancing processing on the multiple to-be-selected driver adaptation plug-ins, wherein the target driver adaptation plug-in is one of the multiple to-be-selected driver adaptation plug-ins; and
send the service request message to the first controller by using the target driver adaptation plug-in.

* * * * *